Oct. 17, 1944. F. S. STOUT ET AL 2,360,594
HIDE PLANIMETER
Filed July 22, 1943 5 Sheets-Sheet 1
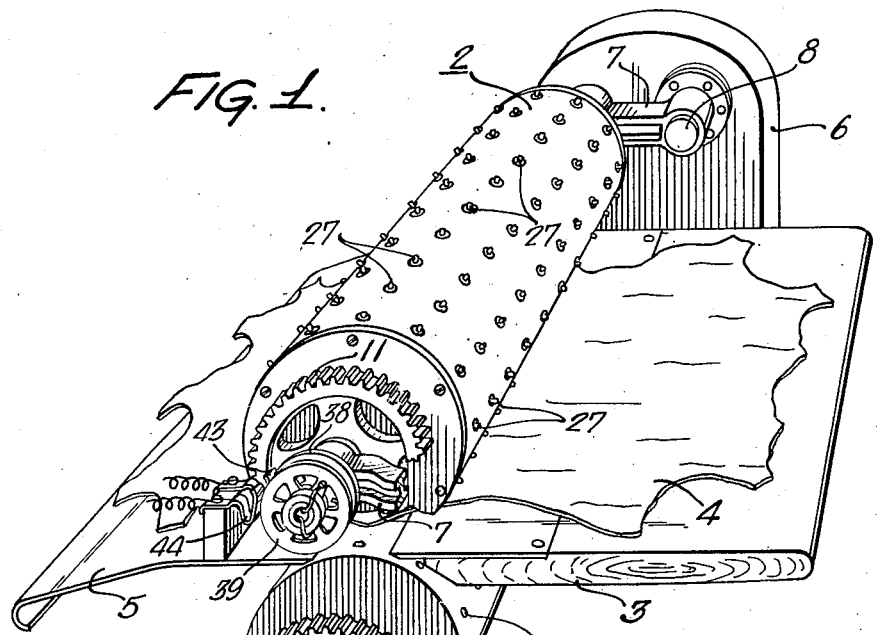
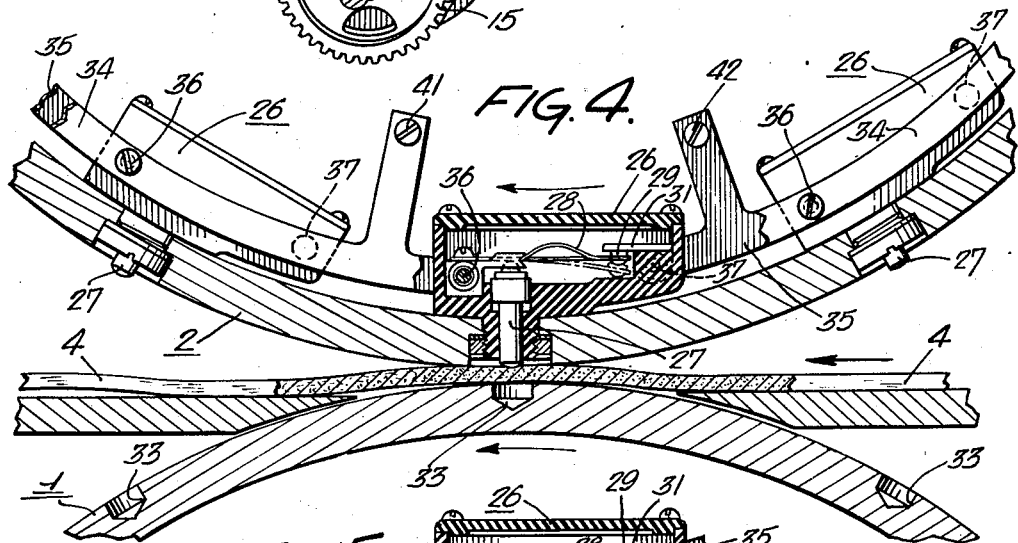
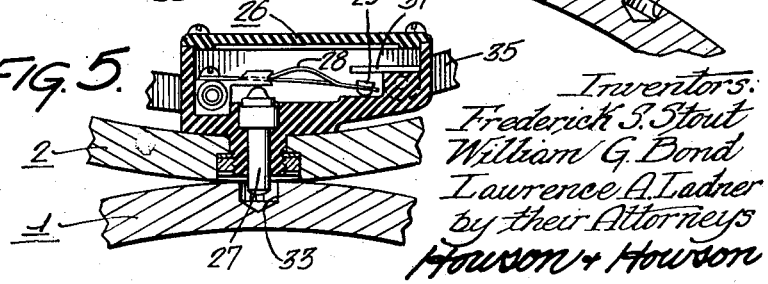

Oct. 17, 1944.   F. S. STOUT ET AL   2,360,594
HIDE PLANIMETER
Filed July 22, 1943   5 Sheets-Sheet 2

Inventors:
Frederick S. Stout
William G. Bond
Lawrence A. Ladner
by their Attorneys
Howson & Howson Oct. 17, 1944.  F. S. STOUT ET AL  2,360,594
HIDE PLANIMETER
Filed July 22, 1943  5 Sheets-Sheet 3

Inventors.
Frederick S. Stout
William G. Bond
Lawrence A. Ladner
by their Attorneys
Howson & Howson Oct. 17, 1944.    F. S. STOUT ET AL    2,360,594
HIDE PLANIMETER
Filed July 22, 1943    5 Sheets-Sheet 4

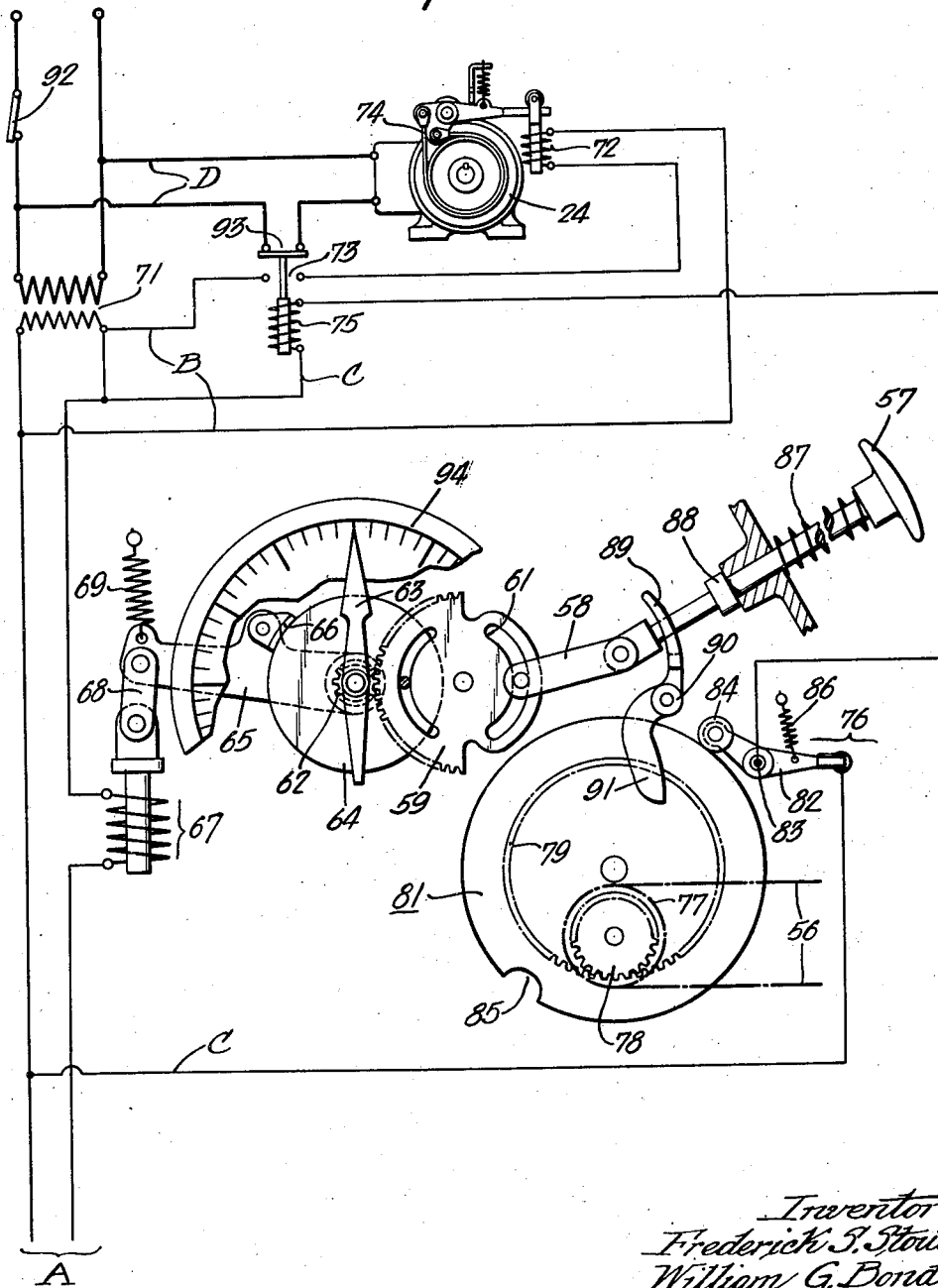

Patented Oct. 17, 1944

2,360,594

UNITED STATES PATENT OFFICE 2,360,594

HIDE PLANIMETER

Frederick S. Stout, Cynwyd, Pa., William G. Bond, Holly Oak, Del., and Lawrence A. Ladner, Camden, N. J., assignors to F. F. Slocomb Corporation, Wilmington, Del., a corporation of Delaware Application July 22, 1943, Serial No. 495,734

4 Claims. (Cl. 33—123)

This invention relates to planimeters more particularly for measurement of hides and the like. The principal object of the invention is to provide a planimeter which shall be characterized by relative simplicity of mechanism and structure and which at the same time will exhibit a relatively high functional efficiency.

The invention will be more readily understood by reference to the attached drawings wherein, Fig. 1 is a fragmentary perspective view illustrating the principal elements of the machine;

Fig. 4 is a fragmentary sectional view illustrating the details of the mechanism;

Fig. 5 is a corresponding view illustrating the elements in a different position of adjustment;

With reference to Fig. 1 of the drawings, the machine comprises a lower feed roll 1, an upper feed roll 2 and a table 3 over which a hide or skin or other work piece 4 may be fed to the feed rolls. A receiving table 5 is provided over which the work piece 4 is fed by action of the rolls 1 and 2.

Figure 3:
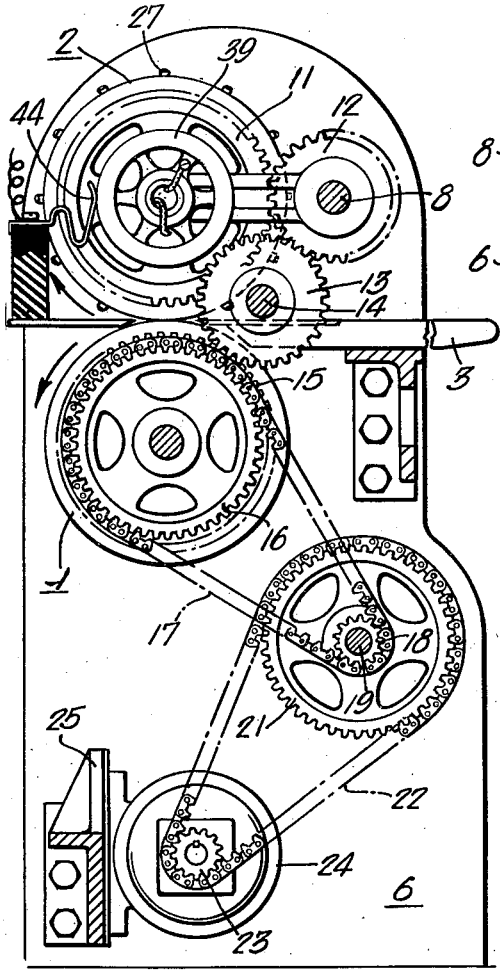
Fig. 3 is a section on the line 3—3, Fig. 2.
Figure 2:
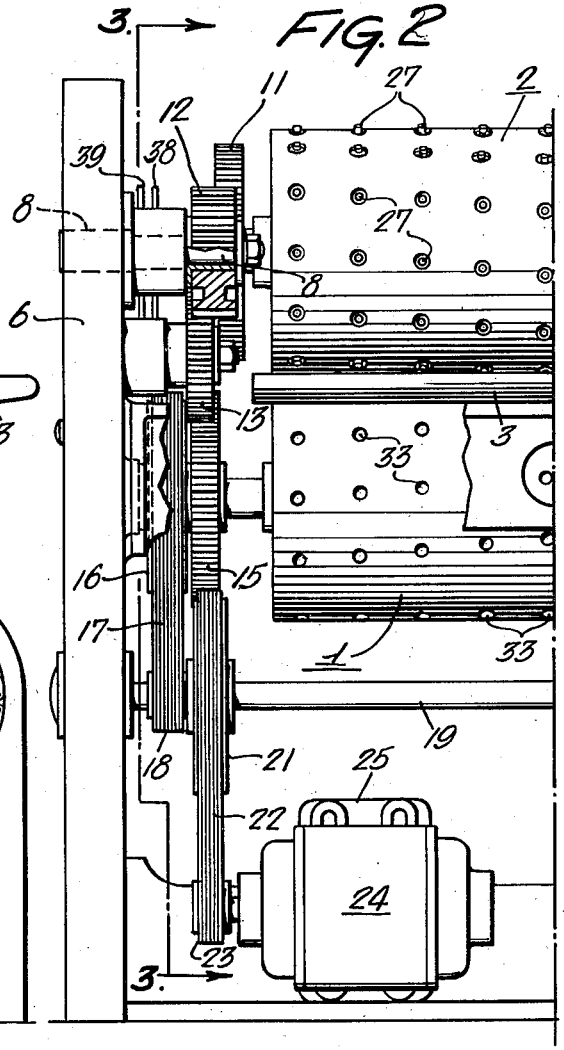
Fig. 2 is a front elevational view of one end of the machine.

The roll 1 is supported in the present instance in fixed journals in the frame 6 of the machine (see Fig. 2). The roll 2 is supported in journals at the outer ends of a pair of arms 7—7, these arms being journaled on pins 8 in the opposite side members of the frame 6, as illustrated in Fig. 1. Roll 2 is provided with a gear 11 and this gear meshes with an idler pinion 12 which is journaled on the frame for rotation about the axis of the pin 8. The pinion 12 meshes in turn with an idler pinion 13, also suitably journaled on the frame as indicated at 14 in Fig. 3, and this pinion meshes with a driven gear 15 which is secured to the roll 1. By this means the two rolls 1 and 2 are positively synchronized. It is to be noted also that the rolls are of the same diameter and rotate at the same peripheral speed. The roll 1 also carries a gear 16 which is operatively connected through a chain 17 with a pinion 18 supported on a cross shaft 19; and the pinion 18 is connected to a second relatively large gear 21 which is connected through a chain 22 with a pinion 23 on the shaft of an electric motor 24, this motor being supported on a bracket 25 in the frame 6. From the motor 25 the feed rolls 1 and 2 are driven at the same rate which corresponds also to the linear velocity of the work piece 4 which, as previously set forth, is fed over the tables 3 and 5 by means of the coacting rolls.

In accordance with our invention, the roll 2 is provided, on the inside, with a plurality of microswitches 26 which may take the form illustrated in Figs. 4 and 5. Each of these switches has an actuator element 27 in the form of a pin which projects through the peripheral wall of the roll 2 and which is normally held in an extended position projecting slightly beyond the cylindrical surface of the roll by action of the spring 28, which, in the present instance, carries one of the contact elements 29 of the associated switch. The other contact element is indicated by the reference numeral 31 and it is to be noted that when the spring 28 is in the normal position, the contact element 29 is separated from the element 31 and the circuit which includes the switch is therefore open. In this position of the spring arm 28, the pin 27 projects beyond the peripheral surface of the roll 2 as shown, for example, in Fig. 5. The switches 26 are arranged within the cylinder 2 in a plurality of circumferential series, each series containing in the present instance 12 switches which are substantially evenly spaced around the circumference so that in each series there is a correspondingly substantially uniform distribution of the pins 27 around the cylinder. As indicated in Fig. 1 there are in the present instance ten of the aforesaid circumferential series of switches and these series are uniformly spaced with respect to each other longitudinally of the cylinder. It is to be noted also by reference to Fig. 1 that the switches are arranged in the several series so that each of the switches is angularly offset about the axis of the roll with respect to the switches not only of the immediately adjoining series but also of all of the other series. Thus, the corresponding switches of the respective series are not interaligned in the true axial direction of the roll but describe a number of spirals on the inner periphery of the cylinder extending generally in the axial direction, the spirals being uniformly spaced around the entire circumference. The pins 27 form corresponding circumferential and spiral series on the outer surface of the cylinder.

Figure 6:
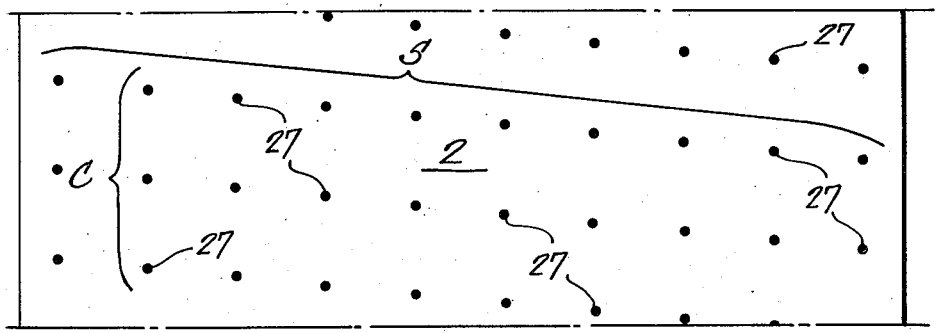
Fig. 6 is a fragmentary development of the cylindrical traverse member.

The arrangement of the pins 27 on the outer face of the cylinder is best illustrated in Fig. 6. In this fragmentary development view the circumferential and spiral series, designated respectively by the reference letters c and s, are clearly shown, and it will be noted that the said spiral series are so relatively arranged and spaced that the terminal pin in each of the series is angularly offset about the cylinder axis with respect to the opposite terminal pin of the preceding series. Thus no two of the pins 27 will have the same angular position about the axis of the cylinder. This means that when any one of the actuator pins 27 occupies a position between the axes of the cylinders 1 and 2 and in the plane which includeus said axes, no other of the actuator pins 27 will occupy a corresponding position.

It is to be noted also that the cylinder 1 is provided with a plurality of series of recesses 33 corresponding in number and relative position to the actuator pins 27, and the cylinders are arranged so that when any one of the pins is in the aforesaid position between and in the mutual plane of the axes of the cylinders it will register with one of said recesses. If, as shown in Fig. 4, the work piece overlies the recess when the parts are in this position the pin 27 will be forced inwardly of the cylinder 2 from the normal extended position with the result that the micro-switch 26 is actuated to close the circuit; but if the work piece is not thus interposed between the pin and its corresponding recess as, for example, in Fig. 5, the projecting end of the pin will enter the recess and the associated switch 26 will remain in the normal open condition.

Figure 7:
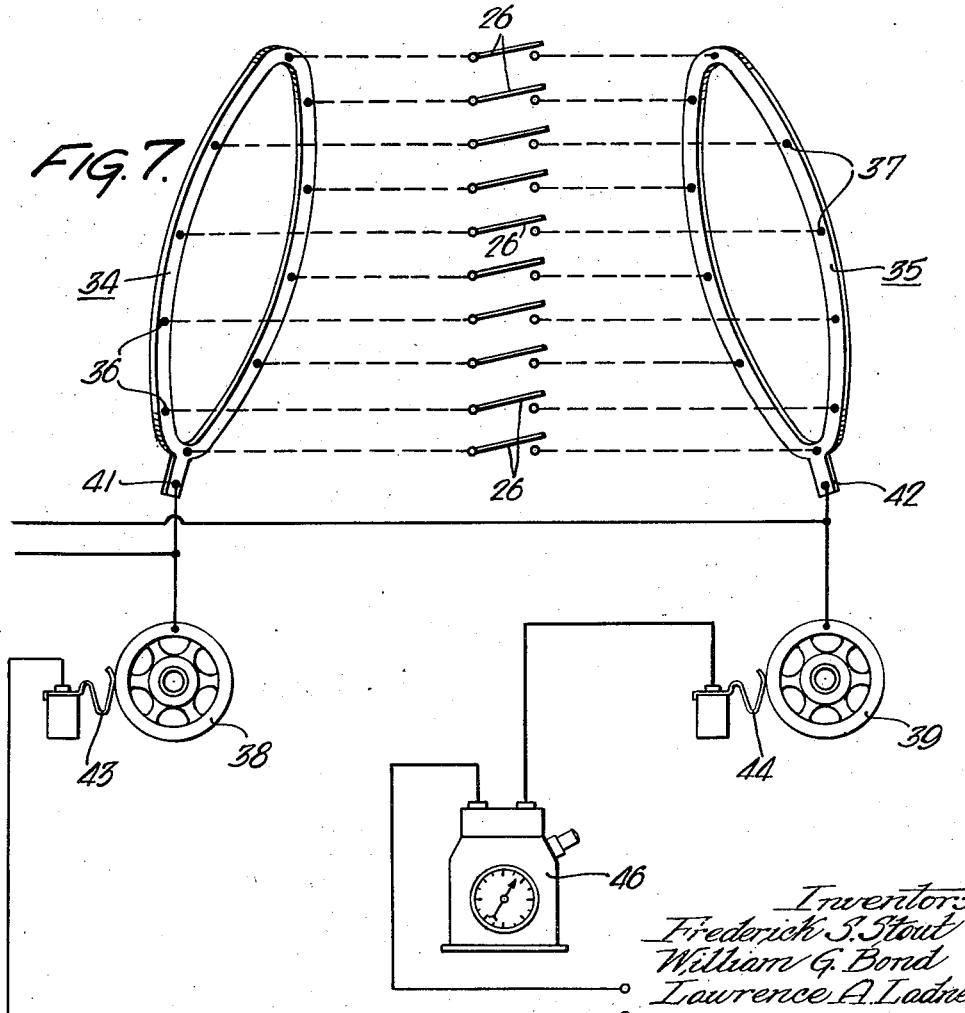
Fig. 7 is a diagrammatic view illustrating the electrical system.

Secured to opposite sides of the several switches which constitute the respective circumferential series are metallic rings 34 and 35 respectively (see Fig. 4). The spring arm 28, and therefore the contact element 29, of each of the switches of the series is electrically connected to the bar 34, as indicated at 36. The contact elements 31 of each of the switches of the series is similarly connected, as indicated at 37, to the ring 35. One of the trunnions of the cylinder 2 carries a pair of commutator rings, 38 and 39, and these rings are connected respectively to the rings 34 and 35 at the points indicated at 41 and 42. The commutator rings 38 and 39 are engaged respectively by brushes 43 and 44 and these brushes, as shown in Fig. 7, are connected in a circuit including a source of current (not shown) and a counting device 46. It is apparent therefore that when any one of the switches 26 of the circumferential series is closed the circuit will be completed through the counter 46 which will thereby be actuated. It will be understood that the rings 34 and 35 of each of the series of switches are connected in parallel with the commutators 38 and 39 so that the closing of any one of the switches on the cylinder 2 will result in an actuation of the counting device. Since, by reason of the peculiar arrangement described above, the switches 26 can be actuated only one at a time, it will be apparent that the device affords a means for accurate estimate of the surface area of the work piece.

Figure 8:
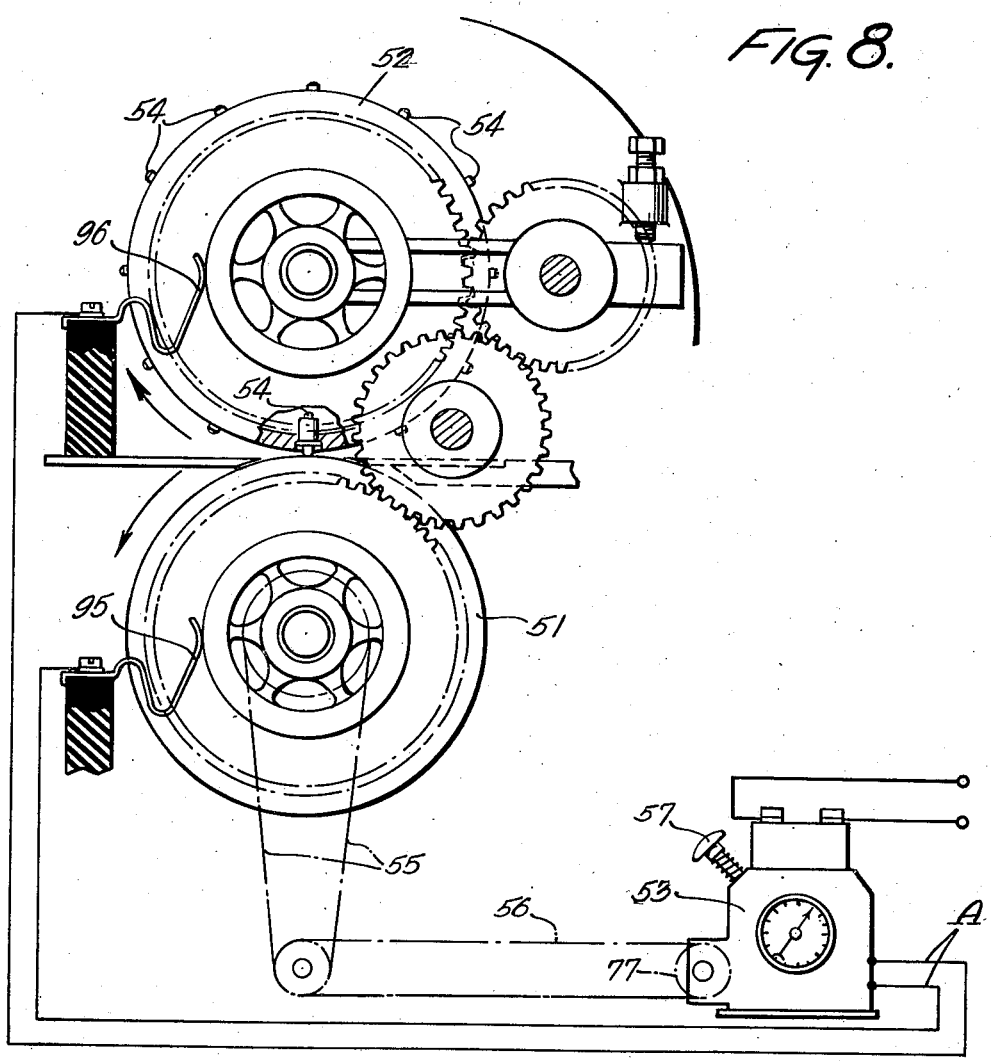
Fig. 8 is a fragmentary side elevational and diagrammatic view illustrating a modification within the scope of the invention.
Figure 9:
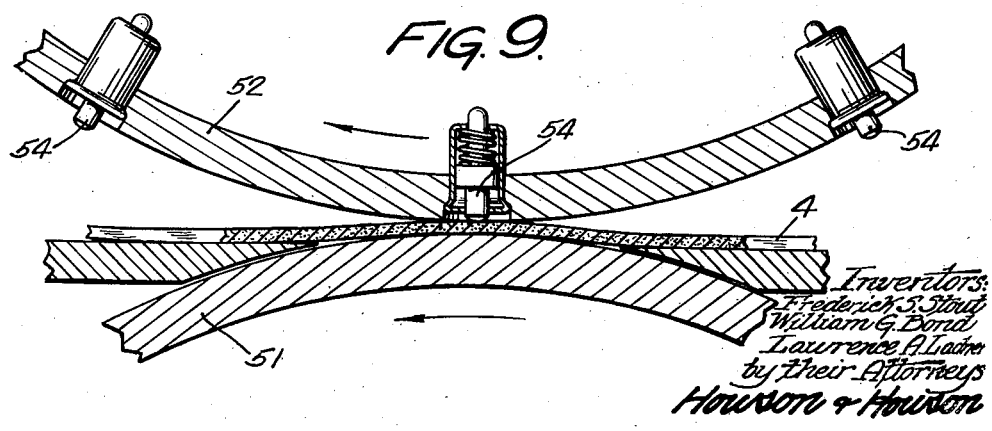
Fig. 9 is an enlarged fragmentary sectional view illustrating details of the mechanism illustrated in Fig. 8; and, Fig. 10 is a diagrammatic view showing still further details of the machine illustrated in Fig. 8.

In the embodiment of the invention illustrated in Figs. 8, 9 and 10, the cylinders 51 and 52, which correspond to the cylinders 1 and 2 of the previously described embodiment, are arranged so that their surfaces are normally slightly out of contact but to an extent less than the thickness of the work piece upon which they may be required to operate. Preferably both of the cylinders are metallic so that they may constitute elements of an electric circuit which includes an electrically actuated counting device 53. Cylinder 52 in this instance carries a plurality of spring pressed plungers 54 which normally project beyond the peripheral surface of the cylinder 52 to an extent bridging the gap between that cylinder and the cylinder 51, whereby in the absence of a work piece between any one of the plungers and the surface of the cylinder 51, the plunger 54 will form a contact between the two cylinders thereby closing the counteractuating circuit. By reason of the fact that in this case the counter is actuated only when one of the plungers 54 fails to engage the work piece, it is apparent that each actuation of the counting mechanism must be deducted from a predetermined maximum at which the counting operation starts. If, for example, one revolution of the cylinders is sufficient or more than sufficient to feed the work pieces entirely through the machine, then the counter 53 at the beginning of the operation is set for the maximum area of a theoretical work piece that would pass through the machine in exactly one revolution of the cylinder 52 and that would be sufficient width to prevent the contacting of any of the plungers 54 with the surface of the cylinder 51. This in effect would correspond to the peripheral area of the cylinder 52. Then in each complete revolution of the cylinder 52, the number of impulses to which the counting device is subjected is in effect deducted from the aforesaid maximum to give a reading on the dial of the counting mechanism corresponding to the surface of the work piece.

It will be apparent that in a device of this type, some means must be provided for synchronizing the operation of the counter with the cyclic operation of the cylinder 52, and this is accomplished in the present instance through the medium of transmission belts 55 and 56 (see Fig. 8). After each complete revolution of the cylinders 51 and 52 (which are of the same diameter), the belts 55 and 56 will cause an interruption in the operation of the counting mechanism and the counting mechanism will remain inoperable until such time as it is reset, through the medium of a resetting plunger 57, to the original setting at which the counting operation must start as described above.

A suitable device of this character is illustrated in Fig. 10 wherein the resetting plunger 57 is connected through a link 58 with a segmental rack 59, connection between the link and the rack being through the medium of a slot 61 in the latter whereby predetermined lost motion is afforded between the link and the segment. The rack segment meshes with a pinion 62 which is connected to a pointer 63 of the counting device, and the pointer in turn is connected to a disc 64 which thereby turns with the pointer. The ratchet disc 64 in turn is operatively associated with an oscillatory arm 65 which carries a friction pawl 66 adapted for operative engagement with the peripheral edge of the disc, the arm receiving its oscillatory movement in part from a solenoid 67, to which the arm is connected by a link 68, and in part from a spring 69, the solenoid when energized acting to draw the arm in one direction and the spring then acting deenergization of the solenoid to return the arm to the original position. Solenoid 67 is connected in a circuit A containing the cylinders 51 and 52 and a transformer 71 through which the circuit is connected to a source of electric energy. The electric system also comprises two parallel circuits designated B and C respectively. The circuit B includes a solenoid 72 and a switch 73, the solenoid being operatively connected as the actuating medium to a brake 74 for the motor 24, and the switch 73 being actuated by a solenoid 75 which forms an element of the circuit C. This latter circuit in addition to the solenoid 75, contains a switch 76, the function of which will be hereinafter described.

The counting device 53 comprises a sprocket 77 to which the chain 56 extends as shown in Figs. 8 and 10. This sprocket is connected to a pinion 78 which meshes with an internal gear 79 formed on the inside of an annular element 81. One of the elements of the switch 76 is a lever 82 which is pivotally supported at 83 so that a roller 84 carried in one end of the lever may bear normally against the periphery of the element 81. When thus supported by the periphery of the element 81 the lever is in the position shown in Fig. 10 wherein the other arm, which constitutes a movable switch element, is held in switch-closing position. When the element 81 turns to a position wherein a recess 85 registers with the roller 84, a spring 86 draws the lever into a position opening the switch 76, the roller 84 entering the recess 85 in obvious manner to permit such movement of the lever.

Means is provided for actuating the lever 82 to close the switch 76, this means being associated in the present instance with the resetting plunger 57. Normally a spring 87 will hold the plunger in the retracted position shown in Fig. 10, but when the plunger is forced inwardly, the sleeve 88 on the plunger stem engages one arm 89 of a pivoted lever 90 and turns the lever so that the other arm 91 moves outwardly into engagement with the roller 84 lifting the roller from the recess 85 and turning the lever 82 in clockwise direction, as viewed in Fig. 10, to an extent closing the switch 76.

The operation of this device is as follows: When the machine is idle, the plunger of the solenoid 75 will be in a depressed position to which it moves by gravity wherein the switch 73 is closed by the switch element carried on the plunger. When, therefore, the switch 92 is closed, the motor 24 will not be immediately energized since the motor circuit D is open at the switch 93. The circuit B, however, will be closed so that the solenoid 72 is energized and the brake 74 will then be applied to the motor. The switch 76 of circuit C will also be open and will remain so until the plunger 57 is pushed inwardly to simultaneously set the pointer 63 in the starting position on the dial 94 and to close the switch 76. Closing the switch 76 effects an energization of the solenoid 75 which elevates the plunger and closes the switch 93, as illustrated in Fig. 10. Simultaneously with the closing of this switch, which energizes the motor 24, the circuit B is broken, the solenoid 72 thereby deenergizes and the brake 74 released. The main circuit A, which, as previously set forth, includes the rolls 51 and 52 which are connected in the circuit through bridges 95 and 96 (see Fig. 8) will at this stage be closed by one or other of the spring plungers 54 on the roll 52 bridging the space between the rollers and contacting the surface of the roller 51. Simultaneously with the starting of the motor 24, therefore, the counting mechanism will begin to operate by impulses effected through the solenoid 67 and the spring contacts 54. Simultaneously also the rotary element 81 will begin to rotate so that when the plunger 57 is released, the recess 85 will have moved out of register with the roll 84 and the lever 82 will thereby be supported by the periphery of the element 81 in a position to maintain the switch 75 closed. Immediately after the starting of the machine, as described above, the operator will feed the work piece between the rolls 51 and 52 and thereafter actuations of the counting mechanism will occur only at such time as the work piece fails to prevent contact between the various plungers 54 and the surface of the roll 51. With the arrangement shown, the element 81 will make one complete revolution of the rolls 51 and 52 and prior to the completion of this revolution the work piece will have passed through the rolls. With completion of the revolution, the roller 84 will again pass into the recess 85 thereby opening the switch 76 deenergizing the solenoids 75 and thereby terminating the plunger of this solenoid to drop by gravity into a position opening the switch 93 and closing the switch 73. This deenergizes the motor circuit D and immediately applies the brake 74 so that the motor will not over-run. The dial 94 will now indicate the area of the work piece which has passed through the machine and the device may be reset and the machine prepared by another cycle of operations by again pressing in the plunger 57.

We claim:

1. In a planimeter, a pair of cylindrical members having rolling contact with the opposite faces of the work and being permanently spaced from each other to an extent predeterminedly less than the thickness of the work piece, an electrically actuated counter, an electric circuit including the counter actuating mechanism and the said rolls, and a plurality of spring pressed elements projecting from the peripheral face of one of said rolls and adapted in extended position to contact the surface of the other of said rolls to complete said circuit and to thereby effect an actuation of the counting device, said elements being distributed in substantially uniformly spaced relation over the peripheral surface of the roll and being offset about the axis of the roll each with respect to all other of said elements whereby said elements are brought one at a time and successively into an operative position with respect to the other of said rolls.

2. In a planimeter, a pair of cylindrical members having rolling contact with the opposite faces of the work and being permanently spaced from each other to a predetermined extent less than the thickness of the work piece, an electrically actuated counter, an electric circuit including the counter actuating mechanism and the said rolls, and a plurality of spring pressed elements projecting from the peripheral face of one of said rolls and adapted in extended position to contact the surface of the other of said rolls to complete said circuit and to thereby effect an actuation of the counting device, said elements being distributed in substantially uniformly spaced relation over the peripheral surface of the roll and being offset about the axis of the roll each with respect to all other of said elements whereby said elements are brought one at a time and successively into an operative position with respect to the other of said rolls, and means for automatically interrupting the operation of the rolls after a predetermined rotational movement in excess of that required for complete passage of the work between the rolls.

3. In a planimeter, a pair of cylindrical members having rolling contact with the opposite faces of the work and being permanently spaced from each other to a predetermined extent less than the thickness of the work piece, an electrically actuated counter, an electric circuit including the counter actuating mechanism and the said rolls, and a plurality of spring pressed elements projecting from the peripheral face of one of said rolls and adapted in extended position to contact the surface of the other of said rolls to complete said circuit and to thereby effect an actuation of the counting device, said elements being distributed in substantially uniformly spaced relation over the peripheral surface of the roll and being offset about the axis of the roll each with respect to all other of said elements whereby said elements are brought one at a time and successively into an operative position with respect to the other of said rolls, and means for resetting the counting device after each cyclic movement of the rolls.

4. In a planimeter, a pair of cylindrical members having rolling contact with the opposite faces of the work and being permanently spaced from each other to an extent predeterminedly less than the thickness of the work piece, an electrically actuated counter, an electric circuit including the counter actuating mechanism and the said rolls, and a plurality of spring pressed elements projecting from the peripheral face of one of said rolls and adapted in extended position to contact the surface of the other of said rolls to complete said circuit and to thereby effect an actuation of the counting device, said elements being distributed in substantially uniformly spaced relation over the peripheral surface of the roll and being offset about the axis of the roll each with respect to all other of said elements whereby said elements are brought one at a time and successively into an operative position with respect to the other of said rolls, means for automatically interrupting the operation of the rolls after a predetermined rotational movement in excess of that required for complete passage of the work between the rolls, and a common means for resetting the counting device after each cyclic movement of the rolls and for starting the rolls on a new cycle.

FREDERICK S. STOUT.
WILLIAM G. BOND.
LAWRENCE A. LADNER.